United States Patent [19]

Yamamoto et al.

[11] 4,316,520
[45] Feb. 23, 1982

[54] UNILATERAL REAR-DRIVE TYPE THREE-WHEELED VEHICLE

[75] Inventors: Hitoshi Yamamoto, Shiki; Masaki Watanabe, Urawa; Shinichi Koizumi, Tokyo, all of Japan

[73] Assignee: Honda Giken Kogyo Kabushiki Kaisha, Tokyo, Japan

[21] Appl. No.: 120,123

[22] Filed: Feb. 8, 1980

[30] Foreign Application Priority Data

Feb. 14, 1979 [JP] Japan .................................. 54-15874

[51] Int. Cl.$^3$ .............................................. B62K 5/06
[52] U.S. Cl. ..................................... 180/215; 74/650; 180/76
[58] Field of Search ...................... 180/70 R, 71, 73 R, 180/73 C, 75, 76, 215, 216, 213, 210; 74/650 X

[56] References Cited

U.S. PATENT DOCUMENTS 1,532,465 4/1925 Woodward ............................ 74/650
3,583,727 6/1971 Wallis ................................. 180/215

FOREIGN PATENT DOCUMENTS

2502529 8/1975 Fed. Rep. of Germany ...... 180/215

*Primary Examiner*—Joseph F. Peters, Jr.
*Assistant Examiner*—Randall A. Schrecengost
*Attorney, Agent, or Firm*—Armstrong, Nikaido, Marmelstein & Kubovcik

[57] ABSTRACT

An improved form of three-wheeled vehicle of the type having a front wheel arranged in the longitudinal plane of symmetry of the vehicle and a pair of rear wheels arranged symmetrically with respect to the vehicle plane. The pivot joint interconnecting the front and rear frames of the vehicle has a turning axis offset from the vehicle plane to that side of the vehicle on which the driving rear wheel is arranged and extending in a direction inclined laterally outwardly from rear to front of the vehicle. Such pivot arrangement is highly effective to improve the driving stability of three-wheeled vehicles of the type concerned, without involving any structural complication or increase in cost of production.

6 Claims, 8 Drawing Figures

UNILATERAL REAR-DRIVE TYPE THREE-WHEELED VEHICLE

BACKGROUND OF THE INVENTION

A three-wheeled vehicle including a vehicle body comprised of a front frame supporting a single front wheel, a rear frame supporting a pair of left and right rear wheels on a common transverse axis, the front and rear frames being connected with each other by means of a pivot joint so that the front frame may tilt to one side or the other about the turning axis of the pivot joint, and a power drive unit, such as an internal combustion engine, operatively connected with one of the rear wheels.

DESCRIPTION OF THE PRIOR ART

Three-wheeled vehicles of the type described, the so-called unilateral rear-drive type, generally have the advantages of structural simplicity of the power transmission between the drive unit and the rear wheel directly associated therewith and hence of low cost of production. Conventionally, however, they are disadvantageous in that the transmission of driving power only to one of the two rear wheels tends to give rise to a turning moment which acts in a direction to cause the vehicle to turn to its side opposite to the side on which the driving rear wheel is arranged. During straight travel of the vehicle, therefore, the driver is required to hold the steering handle in a position to produce a turning moment that acts in a direction opposite to the afore-said turning moment to counterbalance the latter. Further, the driver's steering effort required to turn the vehicle, for example, to the right must generally be different from that required to turn the vehicle to the left. With vehicles of the type described, therefore, the driver's feel in driving the vehicle has been very unsatisfactory.

SUMMARY OF THE INVENTION

The present invention has for its object the provision of a novel unilateral rear-drive type three-wheeled vehicle which is not subject to the above and other disadvantages of the prior art, and which is particularly simple in construction and low in production cost.

Another object of the present invention is to provide a novel three-wheeled vehicle of the type described which is free from any tendency of the steering handle to turn to the right or left during straight travel and, when negotiating a curve, is controllable with generally the same steering feel irrespective of the direction of turn, and thus is highly improved in driving stability.

It is a further object of the present invention to provide a novel three-wheeled vehicle of the type described which is designed to employ a wheel arrangement basically the same as that of a three-wheeled vehicle of the bilateral rear-drive type, including a front wheel arranged in the longitudinal plane of symmetry of the vehicle and two rear wheels arranged symmetrically with respect to this plane, thereby to improve the riding comfort and controllability of the vehicle of the unilateral rear-drive type.

According to the present invention, there is provided a three-wheeled vehicle of the type described which comprises a front frame supporting a single front wheel in the longitudinal plane of symmetry of the vehicle, a rear frame supporting a pair of right and left rear wheels symmetrically with respect to this symmetry plane, and a pivot joint interconnecting the front and rear frames and having a turning axis which is generally offset from the longitudinal plane of symmetry of the vehicle to that side thereof on which the driving rear wheel is arranged and extends in a direction inclined laterally outwardly from rear to front of the vehicle.

The above and other objects, features and advantages of the present invention will become apparent from the following description when taken in conjunction with the accompanying drawings.

DESCRIPTION OF THE PREFERRED EMBODIMENTS

Description will now be made of the embodiments of the present invention with reference to the drawings.

Figure 1:
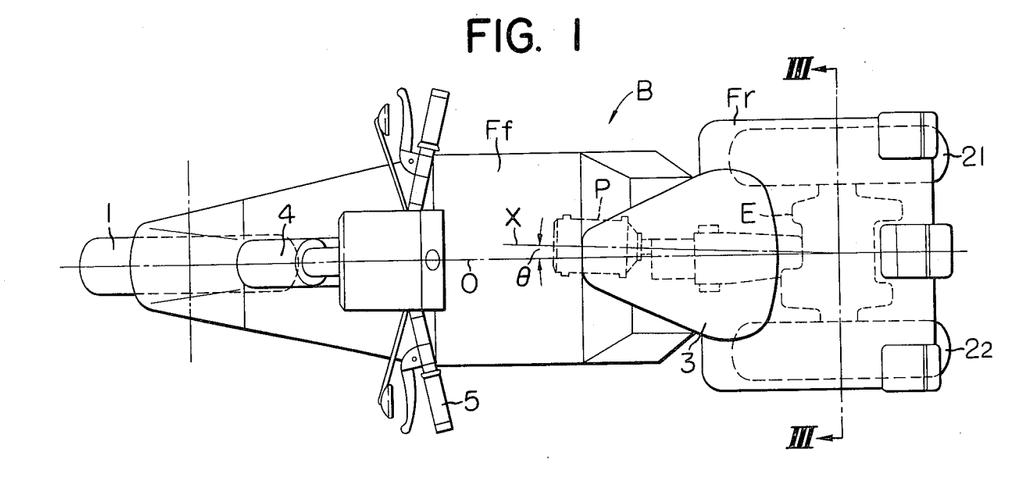
FIG. 1 is a general plan view of one preferred form of three-wheeled vehicle embodying the principles of the present invention.
Figure 2:
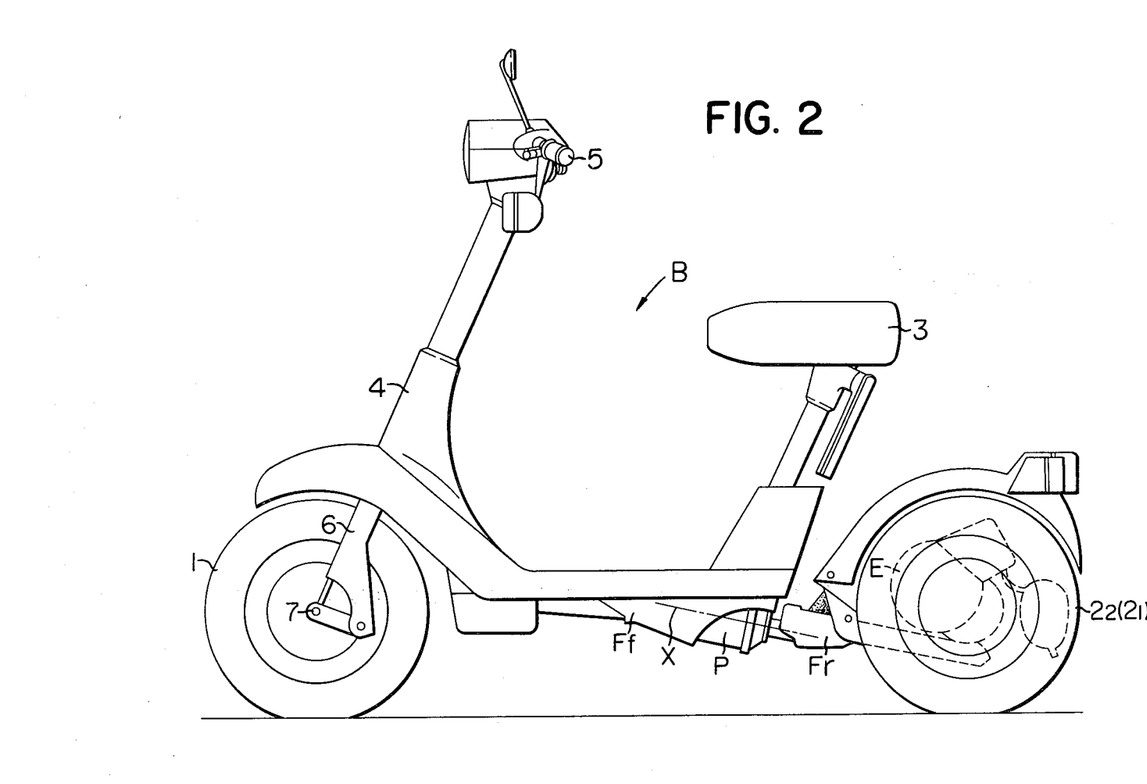
FIG. 2 is a side elevational view of the vehicle in FIG. 1.

Referring first to FIGS. 1 and 2, the body B of the three-wheeled vehicle illustrated is comprised of a front frame $F_f$ which supports a single front wheel 1 and a saddle 3, and a rear frame $F_r$ which supports a pair of right and left rear wheels $2_1$ and $2_2$. As observed, the front wheel 1 is arranged in the longitudinal plane of symmetry 0 of the vehicle while the two rear wheels $2_1$ and $2_2$ are arranged symmetrically with respect to the plane of symmetry 0, that is, at locations equidistant from the plane 0.

Formed on the front frame $F_f$ at the front end thereof is a tubular head support 4 on which a front fork 6 is rotatably mounted. Secured to the top end of front fork 6 is a bar type steering handle 5. The front wheel 1 is supported at the bottom of the front fork 6 by means of a front axle 7.

Figure 3:
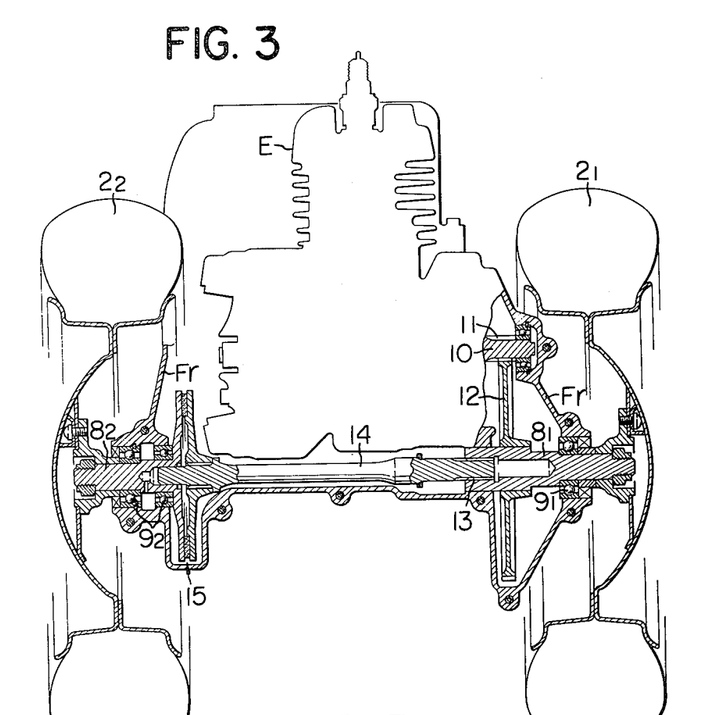
FIG. 3 is a cross-sectional view taken along the line III—III in FIG. 1.

As seen in FIG. 3, the rear wheels $2_1$ and $2_2$ are fixedly mounted on rear axles $8_1$ and $8_2$, respectively, for rotation therewith. The rear axles $8_1$ and $8_2$ are rotatably supported by respective bearing means $9_1$ and $9_2$, which are provided on the opposite sides of the rear frame $F_r$.

In the embodiment illustrated, the right-hand-side rear wheel $2_1$ serves as a driving wheel and, accordingly, a driven gear 12 is fixedly mounted on the right-hand-side rear axle $8_1$. Held in meshing engagement with the driven gear 12 is a drive gear or pinion 11 which is provided on the output shaft 10 of a power drive unit E, such as an internal combustion engine, mounted on the rear frame $F_r$.

Further in the embodiment illustrated, there is provided an intermediate shaft 14 which is spline-connected at one end to the right-hand-side rear axle $8_1$, as indicated at 13 in FIG. 3, and rotatably received at the other end in the adjacent end of left-hand-side rear axle $8_2$. The intermediate shaft 14 and rear axle $8_2$ are connected together through the intermediary of a friction differential unit 15, which is itself well known in the art. With this arrangement, it will be noted that part of the driving force of the driving wheel, i.e., right-hand-side rear wheel $2_1$, is transmitted through the friction differential 15 to the left-hand-side rear wheel $2_2$ to reduce the tendency of the vehicle B to turn to the nondrive side, i.e. in this example to the left side and that, when the vehicle is driven around a curve, the friction differential 15 with its slip action enables the two rear wheels $2_1$ and $2_2$ to roll at speeds different from each other, the rear wheel on the outside of the curve rolling faster than the one on the inside.

The front and rear frames $F_f$ and $F_r$ are interconnected by a pivot joint P the turning axis X of which is generally offset from the longitudinal plane of symmetry 0 of the vehicle B to that side of the vehicle on which the driving rear wheel $2_1$ is arranged and extends in a direction inclined laterally outwardly from rear to front of the vehicle at an angle $\theta$ (FIG. 1) to the longitudinal plane of symmetry of the vehicle. Preferably, the pivot axis X is also inclined upwardly from the rear to the front of the vehicle, as seen in FIG. 2.

Figure 4:
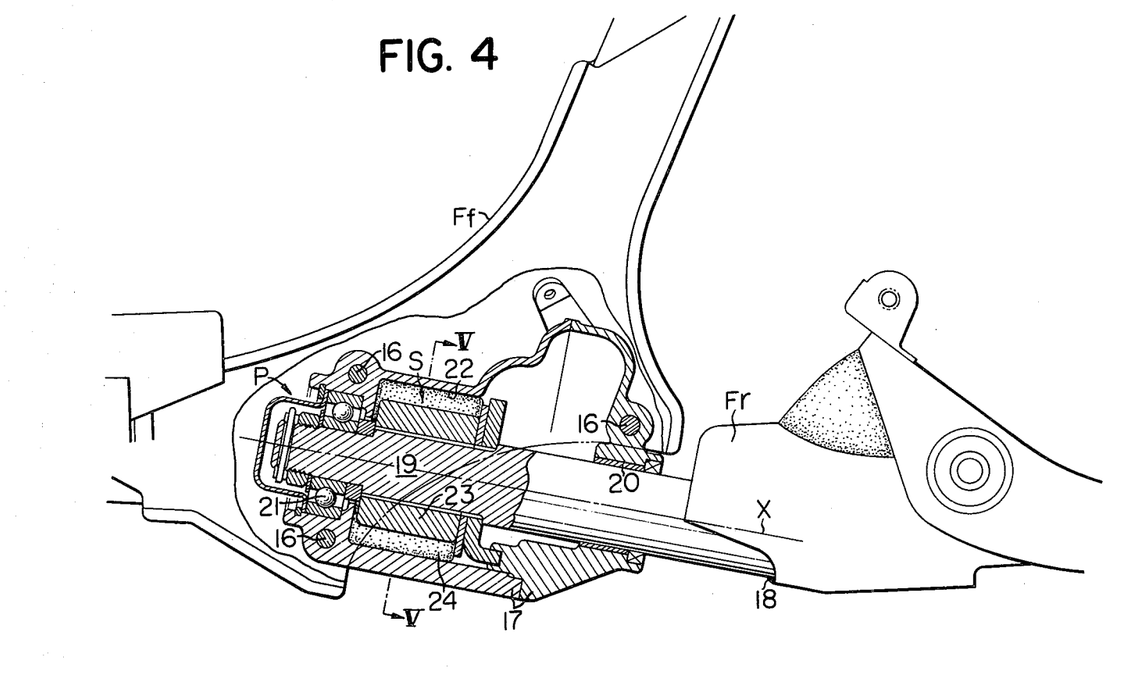
FIG. 4 is a fragmentary side elevational view, partly in longitudinal cross section, illustrating on an enlarged scale the construction of the pivot joint shown in FIGS. 1 and 2.
Figure 5:
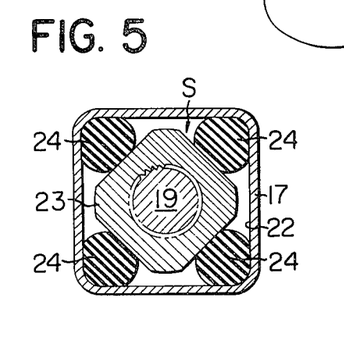
FIG. 5 is a cross section taken along the line V—V in FIG. 4.

Referring next to FIGS. 4 and 5, the pivot joint P is comprised of a pivot housing 17 fixed to the front frame $F_f$ by bolts 16 and a pivot shaft 19 fixed to the rear frame $F_r$ by welds 18 and extending into the pivot housing 17. The pivot shaft 19 is rotatably supported adjacent to its front and rear ends in the front and rear end walls of pivot housing 17 by means of a ball bearing 21 and a plain bearing 20, respectively. The pivot shaft 19 and housing 17 thus assembled together have a turning axis disposed as above described and as indicated at X in FIGS. 1 and 2. Accordingly, the front frame $F_f$ is tiltable about the pivot axis X in relation to the rear frame $F_r$.

In order to resist the tendency of the rear frame $F_r$ to over-turn under the effect of centrifugal force when negotiating a curve, the pivot joint P is provided with a spring device S of the so-called Neidhart type. Specifically, the pivot housing 17 is formed so as to define therein a spring chamber 22 which is substantially square in transverse cross-sectional shape and which chamber accommodates a spring actuator member 23 which is also substantially square in transverse cross-sectional shape and fixedly fitted over the pivot shaft 19. As is clearly shown in FIG. 5, four cylindrical-shaped rubber springs 24 are held one in each of the four corners of the spring chamber 22 in pressure engagement with the respective flat sides of spring actuator member 23. When the front frame $F_f$ rolls or tilts or one side or the other, causing the pivot housing 17 to turn on the pivot shaft 19 about the axis X, the rubber springs 24 are twisted or compressed obliquely against the respective adjacent flat sides of spring actuator member 23, so as to exert a torque on the pivot shaft 19 which counteracts the turning moment acting on the rear frame $F_r$ under centrifugal force.

Figure 6:
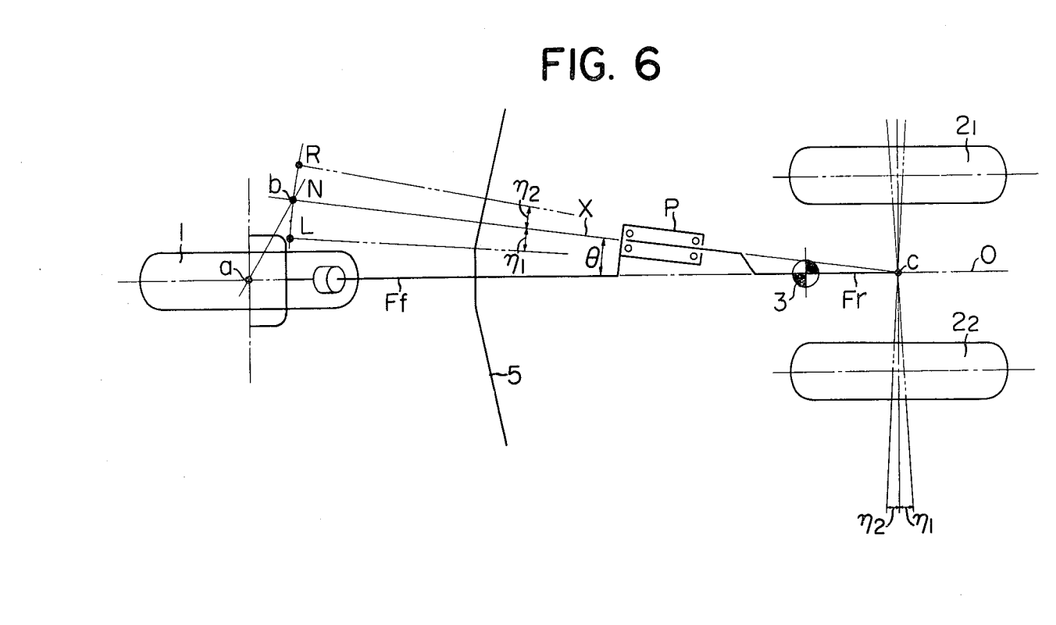
FIG. 6 is a schematic plan diagram of the three-wheeled vehicle, drawn to explain the principles of the present invention.
Figure 7:
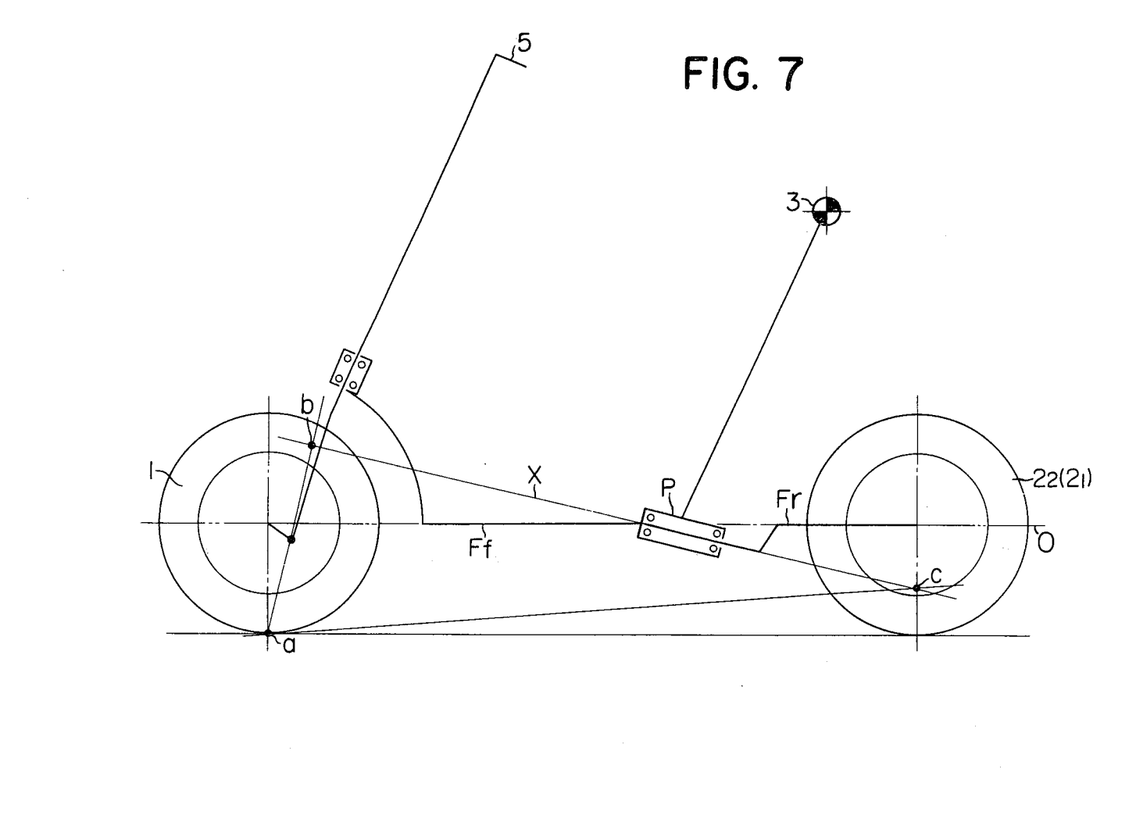
FIGS. 7 and 8 are schematic side and front elevational diagrams of the vehicle in FIG. 6.
Figure 8:
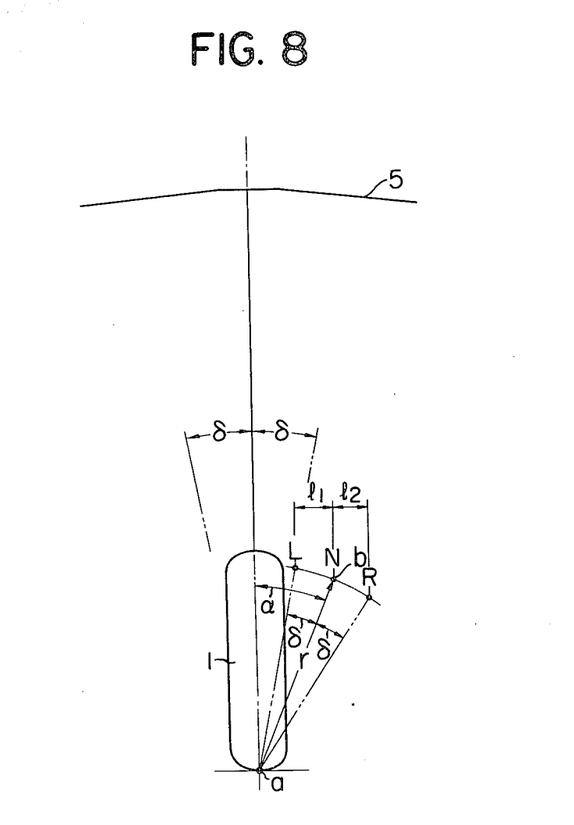

Description will next be made of the principles of operation of the vehicle when driven around a curve, with reference to FIGS. 6 to 8.

When the front frame $F_f$ is caused to roll to turn the vehicle to the right or left, it may be supposed that the triangle abc, having an apex a at the point of contact of the front wheel 1 with the ground, another apex b at the intersection of the pivot axis X with the normal line drawn thereto from the point of ground contact a and a third apex c at the intersection of the pivot axis X with the vertical center line of the rear axle assembly $8_1$-$8_2$, is tilted to the right or left about the base side a-c of the triangle. Accordingly, the pivot joint P lying on the oblique side b-c of the triangle is swung to the right or left together with the triangle side b-c to turn the two rear wheels $2_1$ and $2_2$ to the right or left unitarily through the intermediary of the rear frame $F_r$, thereby expediting the turning movement of the vehicle.

In this connection, it is to be noted that, according to the present invention, the angle of right turn $\eta_2$ of the rear wheels $2_1$ and $2_2$ when the front frame $F_f$ is caused to roll to the right by an angle $\delta$ is more or less different from that $\eta_1$ when the front frame $F_f$ is caused to roll to the left by the same amount of angle $\delta$, as will be explained below.

As described before, the pivot axis X is laid offset from the longitudinal plane of symmetry 0 of the vehicle B to that side thereof on which the driving rear wheel $2_1$ is disposed and extends in a direction inclined forwardly away from the plane of symmetry 0 at an angle $\theta$. Because of this, the triangle abc described above is held in a position tilted, in the embodiment shown, to the right at an angle $\delta$ to the vertical with the front frame $F_f$ assuming its neutral position of zero angle of rolling with the front wheel 1 standing upright, as illustrated in FIG. 8. Reference character N indicates the spatial position of the apex point b of triangle abc in the frame state described. As the front frame $F_f$ is tilted to the left or right by a definite angle $\delta$, the apex point b is moved arcuately about point a to a position L or R, respectively.

The horizontal distance l1 between the positions N and L and that l2 between N and R are compared below. For convenience in calculation, the pivot axis X is assumed to be horizontal. As will be readily understood, the effects of the spatial arrangement of pivot axis X are principally the same in nature irrespective of whether the axis is arranged horizontal or inclined upwardly from rear to front though they vary in absolute value with the direction of the axis.

$$l1 = 2r \cdot \cos(\alpha/2) \cdot \cos(\delta - \alpha/2)$$

$$l2 = 2r \cdot \cos(\delta + \alpha/2) \cdot \cos \alpha/2$$

$$l1 - l2 = 2r \cdot \sin \alpha \cdot \sin \delta > 0$$

where $|\delta| < (\pi/2)$ and $0 < \alpha < (\pi/2)$. Hence $l1 > l2$

Further, since the horizontal distance of movement of the apex point b and the angle of turn of rear wheels $2_1$ and $2_2$ are proportional to each other, the angles of turn $\eta_1$ and $\eta_2$ of rear frame $F_r$ or wheels $2_1$, and $2_2$, corresponding to the respective horizontal displacements l1 and l2 of apex point b are in the following relation:

$$\eta_1 > \eta_2$$

It follows that, as for the work done for turning the vehicle, the amount of work done for leftward tilt of the front frame $F_f$ must be larger than that for rightward tilt of the sample angle. In other words, the input required for turning the rear wheels $2_1$ and $2_2$ to the right is generally lighter than that for their turning to the left. This means that steering the vehicle to the right generally requires less effort on the part of the driver than steering to the left. Due to this characteristic, the vehicle during travel is at all times subject to a definite amount of turning moment, tending to turn to the right.

On the other hand, in cases where, as in the illustrated example, the vehicle is driven by an engine E connected solely with the right-hand side rear wheel $2_1$, the vehicle body B undergoes a leftward turning moment on account of the unilateral rear drive which is counterbalanced by the rightward turning moment described above, ensuring the propensity of the vehicle to run straight. In practical applications, it has been found that, by selecting an angle of lateral inclination $\theta$ of pivot axis in a range of from 1° to 5°, as much as 70% to 90% of the turning moment acting on the vehicle due to unilateral rear drive is effectively counterbalanced so that the vehicle can be driven with quite a normal steering feel.

To summarize, according to the present invention, the spatial position of the axis of the pivot joint and its direction are so specified that the turning moment acting on the vehicle due to unilateral rear-drive is effectively counterbalanced, enabling the vehicle to exhibit a satisfactory propensity to run straight. Accordingly, the driving stability of the vehicle is materially improved, any tendency of the steering handle to turn to the right or left during straight travel or any difference between the driver's steering feel for turning to the right and that for turning to the left being eliminated. Consequently, as with the case of three-wheeled vehicles of bilateral rear-drive type, use can be made of a wheel arrangement including a front wheel arranged in the longitudinal plane of symmetry of the vehicle and two rear wheels arranged on a common transverse axis symmetrically with respect to the vehicle plane so that the riding comfort and controllability of the vehicle are highly improved while ensuring the structural simplicity and low cost production features characteristic of unilateral rear-drive type three-wheeled vehicles.

What is claimed is:

1. A three-wheeled vehicle of the type including a body comprised of a front frame supporting a single front wheel, a rear frame supporting a pair of right and left rear wheels on a common transverse axis, the front and rear frames being interconnected by means of a pivot joint so that the front frame may tilt to one side or other about the turning axis of the pivot joint, and a power drive unit operatively connected with one of the rear wheels, wherein the improvement comprises that said front wheel is arranged in the longitudinal plane of symmetry of the vehicle while said rear wheels are arranged symmetrically with respect to said plane, and wherein said pivot joint is arranged so that the turning axis thereof is generally offset from said plane to that side of the vehicle at which said one rear wheel is arranged and is inclined laterally outwardly from the rear towards the front of the vehicle.

2. A three-wheeled vehicle as claimed in claim 1, wherein said pivot joint is comprised of a pivot housing fixed to said front frame and a pivot shaft fixed to said rear frame and extending into said pivot housing, said pivot shaft being rotatably supported adjacent to respective front and rear ends thereof in front and rear end walls of said pivot housing by a plain bearing and a ball bearing, respectively.

3. A three-wheeled vehicle as claimed in claim 2, wherein said pivot joint is comprised of a spring chamber defined in said pivot housing and shaped substantially square in transverse cross section, a spring actuator member arranged in said spring chamber in fixed relation to said pivot shaft and also shaped substantially square in transverse cross section, and four cylindrical-shaped rubber springs each held in one of the four corners of said spring chamber in pressure engagement with respective flat sides of said spring actuator member.

4. A three-wheeled vehicle as claimed in claim 1, wherein the rear wheels are connected with each other by means of a friction differential unit arranged to frictionally interconnect the rear wheels for unitary rotation during straight travel of the vehicle and to allow the rear wheels to roll at speeds different from each other during vehicle travel around a curve.

5. A three-wheeled vehicle, comprising a chassis including a front member and a rear member; a single front wheel on said front member; a pair of transversely spaced rear wheels mounted on said rear member for rotation about a joint transverse axis and being arranged symmetrically with reference to a longitudinal plane of symmetry of said chassis; a prime mover operatively connected to one of said rear wheels for driving the same; and pivot means connecting said front and rear members for relative tilting movement about a pivot axis which is offset from said symmetry plane towards said one rear wheel and is inclined outwardly away from said symmetry plane in direction from the rear towards the front of said chassis.

6. A vehicle as defined in claim 5, wherein said front wheel is arranged in said symmetry plane.

* * * * *